United States Patent [19]

Violette

[11] Patent Number: 5,088,135
[45] Date of Patent: Feb. 18, 1992

[54] CONVERTIBLE SOFA, BED AND TABLE ASSEMBLY

[76] Inventor: Dennis G. Violette, 7136 N. W. 69th Pl., Redmond, Oreg. 97756

[21] Appl. No.: 682,245

[22] Filed: Apr. 9, 1991

[51] Int. Cl.⁵ .......................................... A47C 17/34
[52] U.S. Cl. ................................... 5/2.1; 5/8; 5/12.1; 5/20; 297/146; 297/240; 297/257
[58] Field of Search ............... 5/2.1, 8, 9.1, 17, 20, 5/12.1; 297/63, 67, 240, 245, 257, 146, 191

[56] References Cited

U.S. PATENT DOCUMENTS

| | | | |
|---|---|---|---|
| 522,569 | 7/1894 | Wherry | 5/17 |
| 1,358,407 | 11/1920 | Baker | 5/17 |
| 2,784,404 | 3/1957 | Shankman | 5/20 |
| 2,909,789 | 10/1959 | Bailey | 5/8 |
| 2,955,297 | 10/1960 | Bailey | 5/17 |
| 3,110,909 | 11/1963 | Bendell | 5/8 X |
| 3,114,155 | 12/1963 | Brenton, Jr. | 5/17 |
| 3,825,959 | 7/1974 | Shankman | 5/8 |

FOREIGN PATENT DOCUMENTS

| | | | |
|---|---|---|---|
| 559155 | 7/1958 | Canada | 5/12.1 |
| 615681 | 3/1961 | Canada | 297/146 |

Primary Examiner—Michael F. Trettel
Attorney, Agent, or Firm—Francis X. LoJacono

[57] ABSTRACT

The present inventon is a convertible sofa, bed and dinette facility that is designed for use in various compact areas having limited space such as commonly found in mobile recreational vehicles, and the facility being defined by two furniture units that together are adapted to be selectively arranged for use as a sofa, a bed or a table assembly. Each furniture unit comprises a frame structure having a main frame section and a secondary extendible frame section. Each furniture unit is releasably secured to a wall structure for any one of the selective arragements. One furniture unit is adapted to be rotatably slidable from one wall position to an adjacent wall. The other furniture unit is adapted to be rotated from one wall to another in such a manner as to be correspondingly arranged to the oppositely disposed furniture unit so as to define a selective mode of use while located in a given compact space. The table assembly is provided by a pair of foldable table sections which are stored in the back-rest frame of each of the respective furniture units.

20 Claims, 7 Drawing Sheets

CONVERTIBLE SOFA, BED AND TABLE ASSEMBLY

BACKGROUND OF THE INVENTION

1. Field of the Invention

The present invention relates generally to a combination sofa, bed and table assembly and more particularly to a two-piece unit that defines a convertible sofa, bed and table apparatus that is designed for use in various compact areas having restricted space such as commonly found in mobile recreational vehicles, wherein the units are adapted to be movably repositioned so as to be selectively arranged to provide a configuration that would define at least one of the following furniture units: a sofa for seating, a bed for sleeping or a table for eating. Each unit is rotatably attached to an adjacent wall so that when the units are moved they can cooperate with each other to define a different mode of operation.

2. Description of the Prior Art

As is well known in the art, various problems and difficulties are encountered in providing suitable arrangements for comfortably seating, sleeping and eating when using or living in a recreational vehicle, small mobile home or a boat. Due to the restricted size and design of most recreational vehicles, the interior area thereof is very limited in space. Thus, each vehicle requires special arrangements to provide suitable cooking, eating and sleeping accommodations for those who use such recreational-type vehicles.

There are many and varied types of dining and sleeping facilities that are presently being used in recreational vehicles and the like which provide very limited facility space. Generally, such combination facility units include many parts that must be rearranged or removed and/or stored when not required to define a particular mode of operation or use. Several of the known apparatuses comprise many of the same components that are designed with different configurations or sizes to meet a given restrictive space within a particular vehicle.

As an example, one such unit having many individual components that must be arranged by connecting and/or disconnecting to form a suitable bed or dining facility is disclosed in U.S. Pat. No. 3,567,272 issued to L. L. Low. This particular invention defines convertible dining and sleeping facilities for vehicles that includes several separate movable components. This apparatus features a dining table, which is flanked by benches fixed in place at all times, and the seat portions of the benches are adapted to be swung onto the table top to form an upper bed, the bench cushions of which make up the complete mattress of the bed.

In the following list of U.S. Patents there are shown various arrangements and combinations of sofa, table and bed apparatuses, as well as other devices in the art:

U.S. Pat. No. 502,579 issued to D. W. Palmer;
U.S. Pat. No. 2,545,891 issued to O. Mehr et al;
U.S. Pat. No. 2,691,174 issued to M. R. Harrison;
U.S. Pat. No. 2,950,485 issued to W. J. Hall;
U.S. Pat. No. 3,035,277 issued to J. Sproule;
U.S. Pat. No. 3,076,977 issued to J. Maguire.

SUMMARY AND OBJECTS OF THE INVENTION

The present invention comprises a novel arrangement of a combination sofa, bed and table assembly that is specifically adapted for use in compact mobile vehicles, wherein limited space is available for such use. Hence, the present invention comprises a two-piece sofa unit that utilizes the same space in a given area, wherein each sofa unit is independently connected to an adjacent wall structure or the like, so as to be rotatably swung into a selected position to define one of three distinct arrangements. The three arrangements consist of a sofa, a bed or a dinette assembly that can be readily established by very simple operations heretofore not found in the art. Each sofa unit is uniquely assembled so as not to require the need to store any of the components thereof when changing from one configuration to another.

Accordingly, each unit comprises a frame structure that is defined by a main frame section having an upright back member and an extendible secondary frame section which is adapted to be extended outwardly of the main frame section when each unit is used in a bed arrangement. Each frame structure of the respective sofa unit includes a back rest cushion and a seat cushion, and is releasably secured to an adjacent wall. The sofa units are adapted to be rotatably swung from one adjacent wall to the other so as to be repositioned for a particular configuration of use. That is, a space in a given area is defined by three walls, a side wall and oppositely disposed end walls.

When a dinette assembly is to be formed the two units are rotated so that each upright back member is secured against the respective opposite facing end wall, whereby the units face each other in a seating configuration. The foldable table fixtures are extended outwardly from their respective upright back members and positioned between the two oppositely facing units.

When a sofa arrangement is required the table fixtures are folded into the upright back member and covered with the back rest cushion. Each unit is then moved to a side-by-side configuration and secured in place against the side wall of the given area.

To change from a sofa configuration to a bed arrangement, a lever located in the front of each frame structure is operated, whereby the folded or retracted secondary frame section of each unit is extended outwardly from the secured main frame section. The two frame sections will then define a larger, substantially flat, frame structure on which the back-rest cushion is placed alongside the seat cushion. When each unit is arranged in this configuration the four cushions define a mattress-type bed.

Accordingly, it is an object of the present invention to provide an apparatus of the character as described above that can be readily changed to any one of the possible arrangements or configurations by simply rotating and swinging each unit to a selective position within a limited space in a given area, more particularly with respect to recreational vehicles and the like, such as trailers and boats.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Novel features and advantages of the present invention, in addition to those mentioned above, will become apparent to those skilled in the art from reading the following detailed description in conjunction with the accompanying drawings wherein.

DETAILED DESCRIPTION OF THE INVENTION

Figure 1:
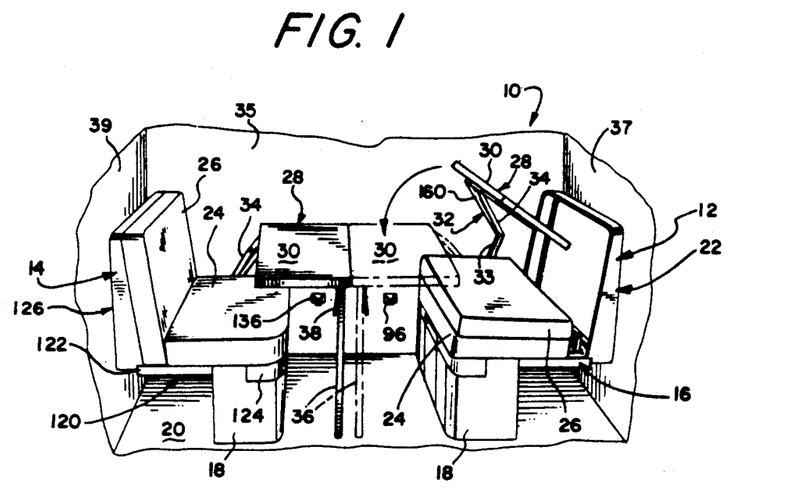
FIG. 1 is a pictorial view of the present invention showing the combination sofa, bed and table assembly in a dinette configuration located in the appropriate limited space, wherein the two units are secured to the respective opposite end walls defining the designated space.
Figure 2:
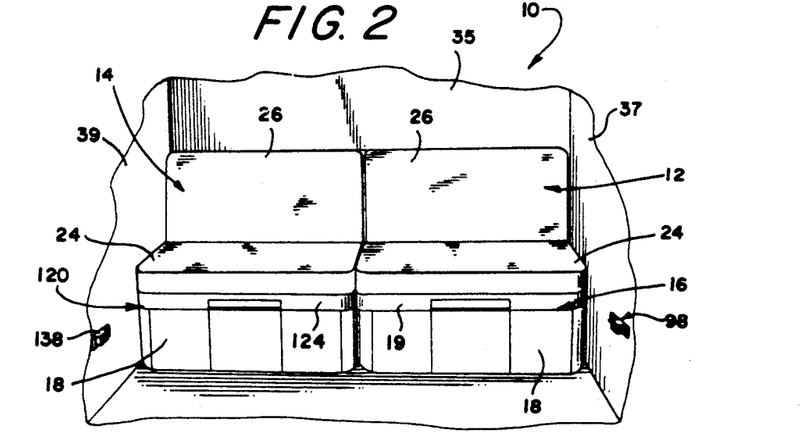
FIG. 2 is a pictorial view illustrating the two seating units of the assembly in a side-by-side sofa arrangement along the side wall of the designated space.
Figure 3:
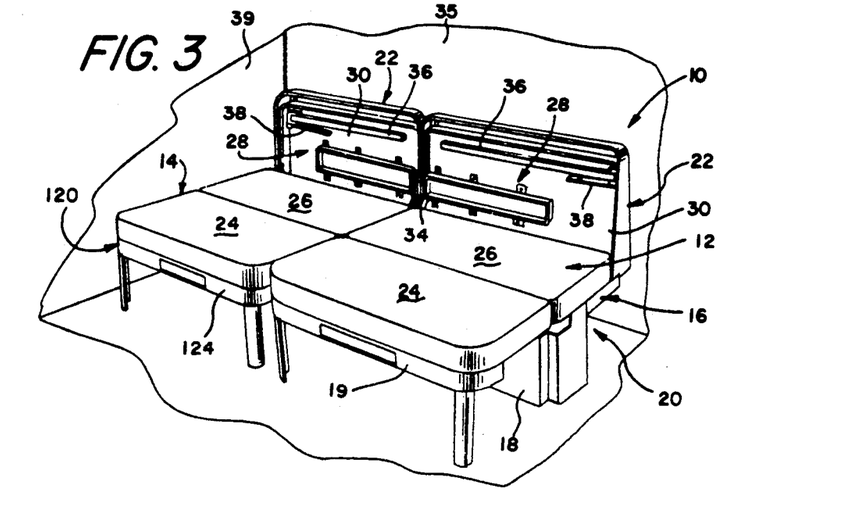
FIG. 3 is a pictorial view illustrating the two seating units having the frame structure thereof arranged in an extended bed position.

Referring now to the illustrations of FIGS. 1, 2 and 3, there is shown the present invention that defines a convertible sofa, bed and dinette facility, generally indicated at 10. The convertible facility 10 is basically provided by a pair of furniture units. These furniture units will be hereinafter referred to as a right sofa or seat unit 12 and a left sofa or seat unit 14. Both right unit 12 and left unit 14 comprise a frame structure, designated generally at 16, which is defined by a main frame section 17 and an extendible secondary frame section 19, and includes suitable housing provided by wall-like coverings 18 which will form an enclosed storage area 20 under each of the frame structures, if so desired, as shown in FIG. 1 thereof. Included as part of each frame structure 16 is a back-rest frame member 22, which is fixedly attached as part of frame structure 16. A more detailed description will hereinafter be disclosed as to the frame structure of each of the respective sofa units.

A seat cushion 24 is positioned over frame structure 16, and a back-rest cushion 26 is provided to cover the back-rest frame member 22. When the two sofa units are arranged to define a bed, the back-rest cushions 26 are removed and positioned on the extended section of the respective frame structures 16, as illustrated in FIG. 3 of the drawings. Also shown in FIG. 3 is that sofa seats or units 12 and 14 are provided with a table apparatus 28 that is folded within the back rest frame member 22. These tables are normally covered by their respective cushions when the convertible facility 10 is arranged in either a sofa mode or a dinette mode, as illustrated respectively in FIGS. 1 and 2. However, in the dinette mode of FIG. 1 the back-rest cushions 26 are adapted to be folded down to allow each respective hidden table apparatus 28 of each unit to be folded outwardly therefrom. Once the tables are in a dinette mode of operation the back rest cushions are replaced to again become a back rest for the unit. Accordingly, each table top 30 of table apparatus 28 is hingedly secured to the respective right and left frame structures 16 by foldable table-support means so as to form a single table structure. In FIG. 1 the right side table is shown being moved to the position indicated in phantom lines. Thus, the table structure is defined by connecting and interlocking the two juxtapositioned table tops 30 between the oppositely disposed sofa seats or units 12 and 14. The foldable table top 30 includes a table-support means, indicated generally at 32, and comprises foldable support arms 33 and 34 which are hingedly connected between the frame structure 16 and table top 30 and a foldable front support leg 36. Support leg 36, when not in use, is stored under table top 30, as illustrated in FIG. 3, and is folded outwardly therefrom when the dinette mode is to be employed. Table leg 36 is hinged to the underside of the table top 30 and is unfolded therefrom be means of a releasable latch means 38 and then locked in the extended support position by said means. In FIG. 1 leg 36 is shown fixed in a downward support position at the front of the table top 30.

Figure 4:
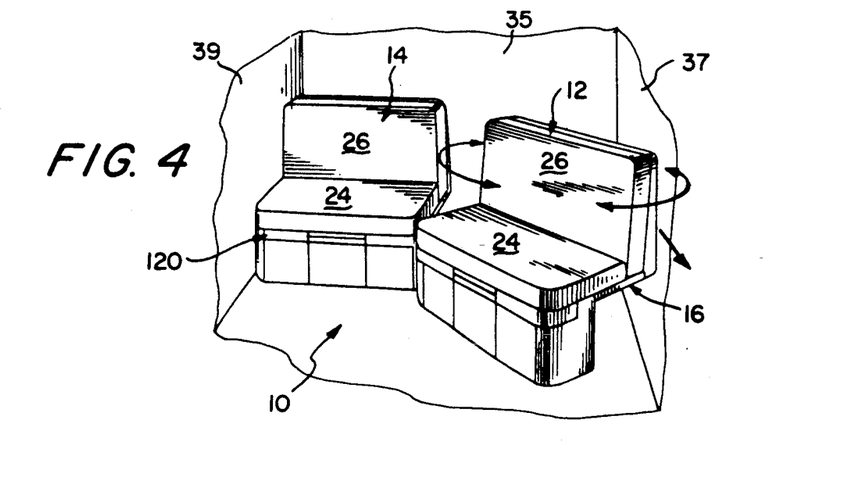
FIG. 4 is a pictorial view illustrating the right unit being rotated and swung for repositioning to the adjacent end wall.
Figure 5:
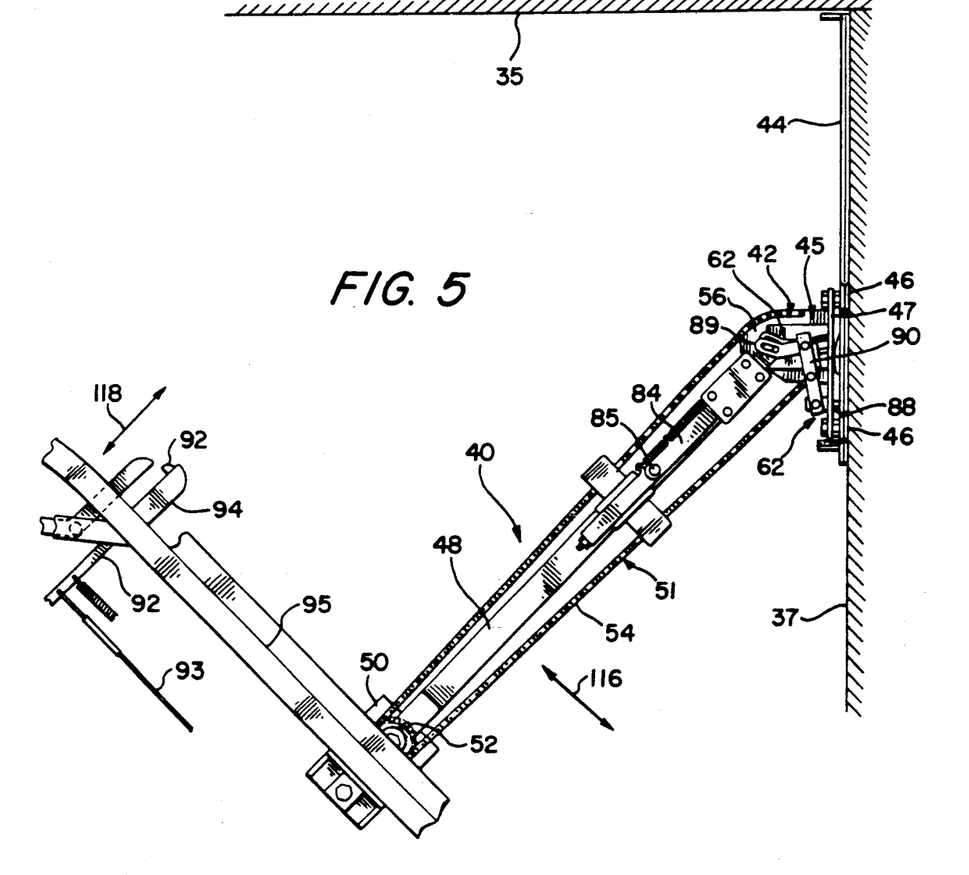
FIG. 5 is a top plan view of the repositioning arm mechanism of the right seating unit.
Figure 6:
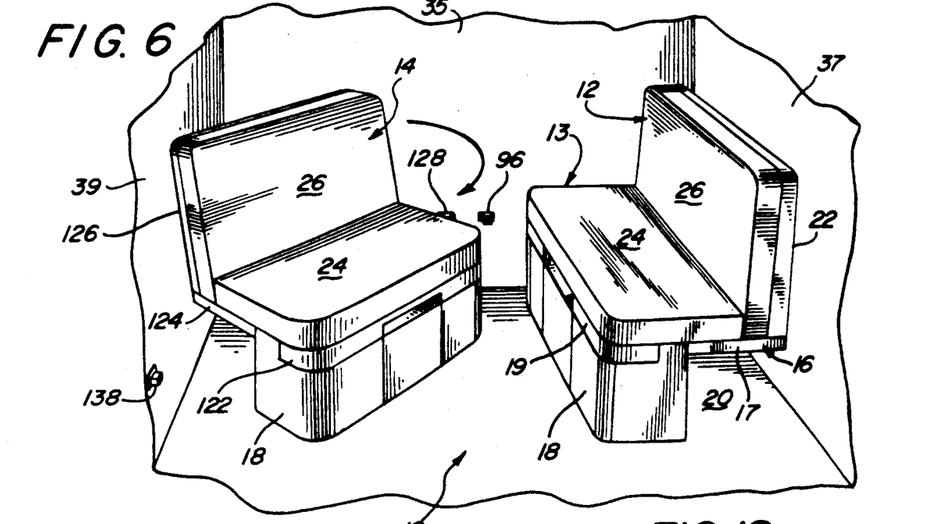
FIG. 6 is a pictorial view illustrating the left unit being rotated and swung for repositioning on one of the adjacent walls.

Referring now to the pictorial view of FIG. 4, there is shown the left sofa unit 14 locked in the sofa position against a side wall 35, as might be found in a recreational vehicle. The right sofa unit 12 is illustrated as being rotated and swung from side wall 35 to a locked position against end wall 37. Right sofa unit 12 now becomes a seat unit for the dinette mode and is so positioned as to allow the left unit 14 to be rotated against the opposite end wall 39, as shown in FIG. 6. Thus, due to the very limited space commonly provided in such vehicles as RVs, trailers and boats, the two units are provided with individual positioning means. In FIG. 5, there is shown the positioning means, indicated generally at 40, which is adapted for the rotating and swinging movement of the right unit. This particular positioning means comprises a slide means, indicated at 42, which is slidably mounted to end wall 37. That is, slide means 42 includes a fixed roller-slide plate 44 that is mounted to end wall 37 on which a combination slidable and pivotal bracket 45 is slidably supported by a plurality of rollers 46 that are secured to the back plate 47 of slidable bracket 45. A carriage arm member 48 is positioned between the slidable pivotal bracket 45 and a fixed pivotal bracket 50, which is affixed to the rear of frame structure 16. The ends of carriage arm 48 are pivotally mounted to the respective pivotal brackets 45 and 50. Also included is a motion-control means, generally indicated at 51, which regulates the timing and movement of right unit 12 as it is rotated and swung from one position to another.

Figure 10:
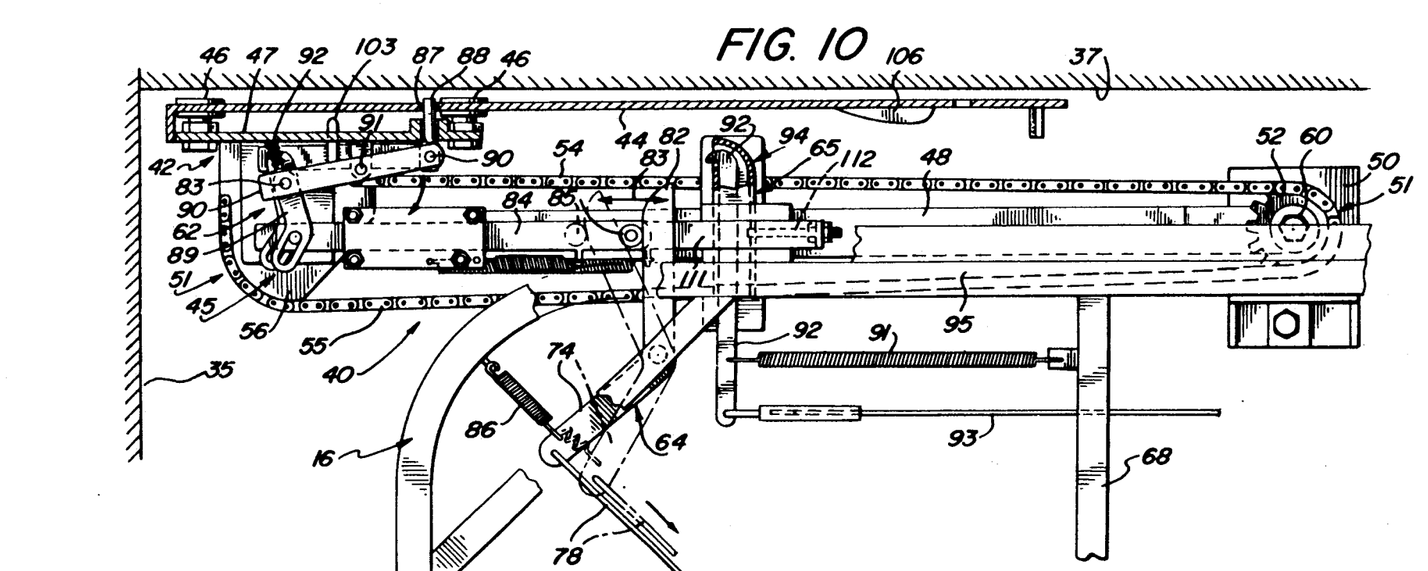
FIG. 10 is a top plan view of the arm mechanism of the right unit and the track device locked in position, wherein the unit is positioned against the end wall.

The motion control means comprises a fixed sprocket member 52, illustrated in FIG. 10, that is fixedly mounted on fixed pivotal bracket 50. A linkage belt or chain 54 is wrapped around gear member 52 so as to allow both sides 55 of the link chain 54 to extend back along both sides of carriage arm 48 for attachment to one of the bracket plates or ears 56 of slidable pivotal bracket 45, as is more clearly illustrated in FIGS. 10 and 11.

To provide a smooth swinging movement of right unit 12 from one position to another, positioning means 40 is provided with an overriding means defined by an elongated override spring 58 that is attached to a pivot pin 59 of slide bracket 45 and to a pin 60 on fixed bracket 50.

The sliding operation between roller-slide plate 44 and slide bracket 45 is controlled by a releasable slide-control means, generally indicated at 62. The releasable slide control means includes an actuating means, designated generally at 64. Actuating means 64 is arranged so as to simultaneously operate both the releasable slide control means 62 and a frame locking means, indicated at 65. (See FIGS. 8, 10 and 11.)

Figure 8:
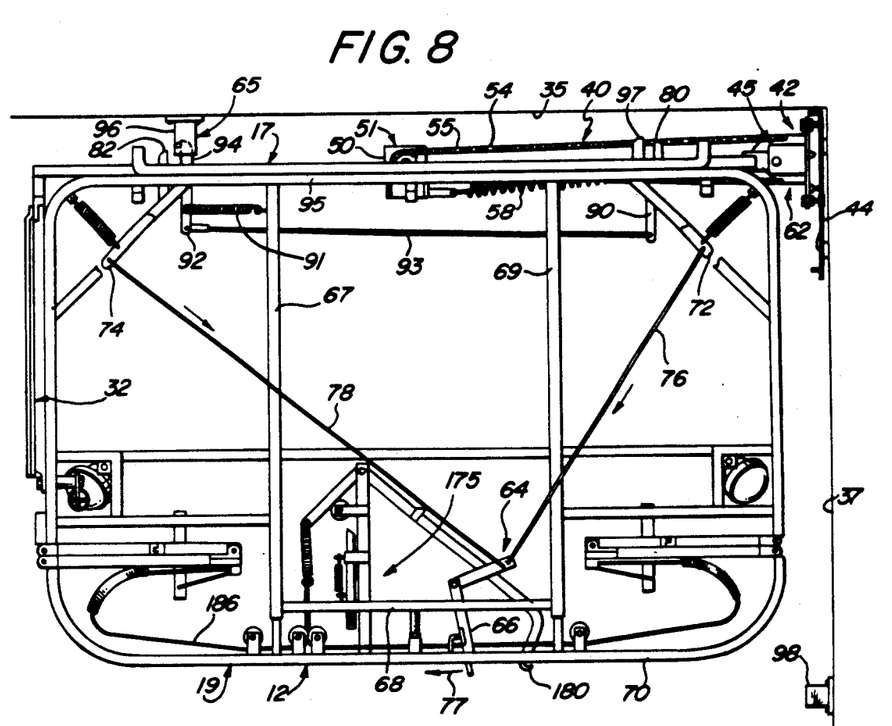
FIG. 8 is a top plan view of the right sofa unit with the cushions removed to better illustrate the frame structure thereof.
Figure 9:
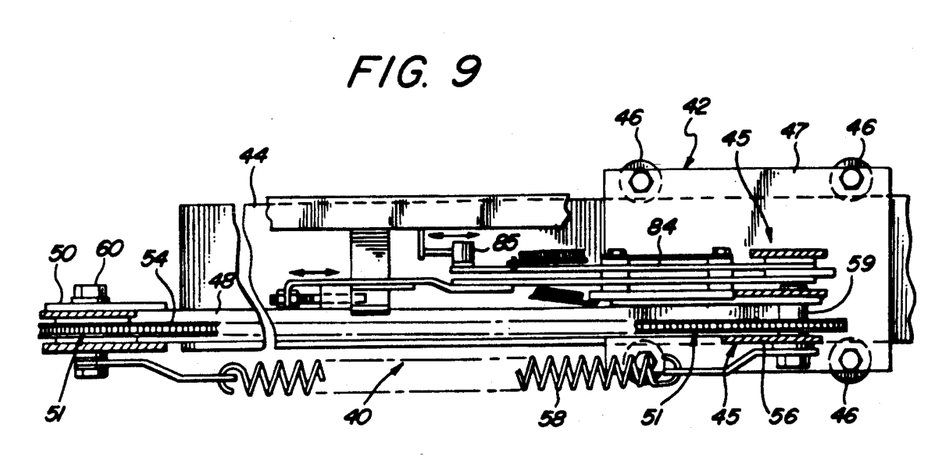
FIG. 9 is an enlarged side elevational view of the arm mechanism of the right unit mounted to a horizontal track device.

Actuating means 64 comprises a hand-operated crank lever 66 (FIG. 8) which is pivotally attached to a transverse strut member 68 positioned adjacent the front of main frame 17. Strut member 68 is fixedly attached between a pair of elongated longitudinal tubular members 67 and 69 of the main frame 17. The free end of hand crank lever 66 extends outwardly from the front transverse frame member 70 of the secondary frame section 19. Crank lever 66 is interconnected to a pair of bell crank members 72 and 74 by means of rods 76 and 78, respectively. Both bell cranks 72 and 74 are part of the releasable slide-control means 62, wherein the free ends thereof define engaging head members 80 and 82, respectively, which actuate slide arm 84 when either head member engages pin 85 fixed to slide arm 84. When right unit 12 is positioned in a sofa mode against side wall 35, as shown in FIG. 8, head member 80 is in position to engage pin 85. When right unit 12 is rotated to the position against end wall 37, head member 82 will engage pin 85 as illustrated in FIG. 10. However, when the right unit is locked into a secured mode of operation either against wall 35 or wall 37, slide-control means 62 is locked to roller-slide plate 44, as shown in FIG. 10, by means of lock pin 88.

Figure 11:
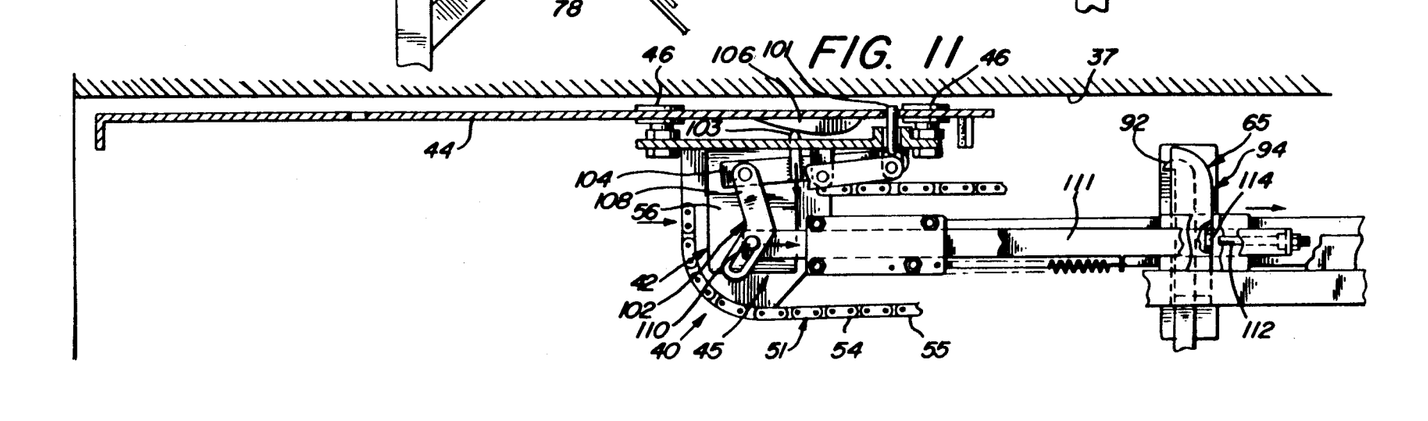
FIG. 11 is a top plan view of the arm mechanism of the right unit with the track device thereof being positioned in a fully extended arrangement.

Side arm 84 moves back and forth, as indicated by arrow 83, whenever bell crank 72 and 74 are operated as indicated by phantom lines in FIG. 10. Back plate 47 is normally locked in a retracted position when right unit 12 is arranged in a selective mode. The locked position is illustrated in FIG. 10, wherein slide arm 84 is in a biased rest position. That is, a spring 86 is attached to one end of each bell crank 72 and 74, biasing them to be positioned in a inactive mode, whereby locking pin 88 is slidably mounted in back plate 47 of bracket 45 and is received through opening 87 formed in roller-slide plate 44, thereby preventing movement along plate 44 of the slide and pivotal means 42. To release lock pin 88, there must be forward movement of slide arm 84 which will move interconnected linkage members 89 and 90 against outwardly biasing spring 92 positioned between back plate 47 and linkage member 90. Member 89 is pivotally connected to member 90 by pivot pin 83. Since locking pin 88 is movably attached to linkage 90 it is retracted from hole 87. This permits slide-control means 62 to freely move along roller-slide plate 44 from one end to the other as illustrated in FIG. 11. In FIG. 11 roller-slide plate 44 is fully extended and locked into position by locking pin 88 which is shown located in hole 101, whereby bracket 45 is secured in place. Accordingly, when bracket 45 and frame-locking means 65 are released, frame structure 16 can then be moved along with its related components, such as positioning means 40, carriage arm 48 and all the related parts that are supported thereby as a complete unit.

It is important to note that actuating means 64 is also adapted to simultaneously release both frame-locking means 65 and the combination slide-and-pivotal means 42. Thus, as shown in FIG. 8, by pulling front lever 66 to the left (shown by arrow 67), rod 76, which is connected to bell crank 72, will cause frame-locking means 65 to be released together with pivot means 42. Frame structure 16 is then free to swing for repositioning from one mode of operation to another, as illustrated in FIGS. 4 and 5. As mentioned heretofore, when unit 12 is locked in the position against wall 35, it can be either arranged in a sofa configuration or a bed configuration, and when locked against wall 37 it is positioned for the dinette arrangement.

An extension lever 90 is affixed to bell crank 72 and is interconnected to a spring-loaded latch member 92 by means of rod 93. A spring 91 is located between latch 92 and frame member 68. Latch member 92 is operably mounted in a first latching tongue, indicated at 94 in FIGS. 8 and 10. Latching tongue 94 is mounted to the rear frame member 95 of main frame section 17 adjacent the left side thereof so as to be received in a keeper member 96 mounted to the side wall 35. Thus, to release frame structure 16 actuating means 64 is operated, whereby both the releasable slide-control means 62 and the frame locking means 65 are operated at the same time. That is, rod 93 will pull latch 92 out of engagement with the housing of latch keeper 96, thereby freeing latch tongue 94 from engagement therewith. Accordingly, unit 12 can at that time be pulled outwardly from wall 35, whereby slide bracket 45 is moved forward along roller plate 44 to an extended locked position as, illustrated in FIGS. 5 and 11. This then allows unit 12 to be fully extended outwardly from wall 35, so as to provide enough room for the unobstructed rotation of left unit 14, which is illustrated in FIG. 6. It should be noted that roller-slide bracket 45, when in a fully extended position, is again locked in place by pin 88 in hole 101, but only until left unit 14 is repositioned against end wall 39 in the dinette arrangement. The movement and operation of left unit 14 will be hereinafter described in more detail.

As roller-slide bracket 45 reaches the fully extended locked position, as seen in FIGS. 5 and 11, a carriage-locking means 102 is released. That is, cam pin 103 mounted to cam arm 104 engages cam member 106 (shown in FIG. 11). Cam member 106 is affixed to slide plate 44. Cam arm 104 is pivotally connected at one end thereof to back plate 47 and at the opposite end to a slotted link member 108 so as to slidably move lock-release arm 111 which is slidably mounted along carriage swing arm 48. A connecting pin 110 is mounted to the end of slidable lock release arm 111 and is positioned in the slot of link member 108. As cam pin 103 engages cam member 106 all of the connected parts 104, 108 and release arm 111 move, causing lock pin 112 mounted on the end of lock release arm 111 to be freed from hole 114 formed in latch tongue 94. Since latch tongue 94 is secured to frame structure 16, carriage arm 48 can not be free to swing and allow frame structure 16 to rotate at pivotal bracket 50 until lock pin 112 is released from latch tongue 94. Once carriage arm 48 of positioning means 40 is freed from frame structure 16, then both the positioning means 40 and frame structure 16 are free to move in the direction of the respective arrows 116 and 118, as indicated in FIG. 5. Accordingly, as illustrated in FIG. 4, unit 12 is rotated to a fully extended parallel position against end wall 37 as shown in FIG. 6. This provides enough room in the limited space to allow left unit 14 to be released and rotatably moved from side wall 35 to end wall 39.

Figures 7, 17, 18, 19:
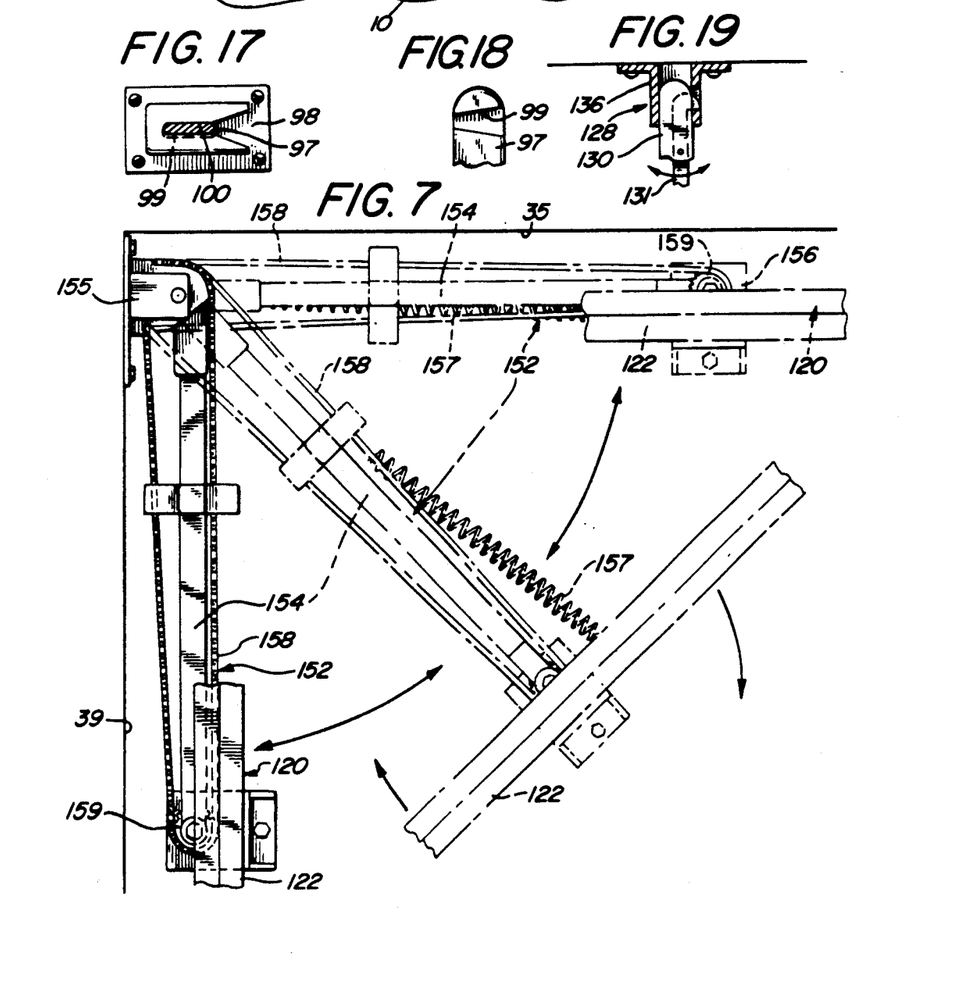
FIG. 7 is a top plan view of the repositioning arm mechanism of the left unit.
FIG. 17 is a front view of a latch keeper housing with a latch tongue mounted therein.
FIG. 18 is a partial view of a latch tongue showing a groove formed on the bottom surface thereof.
FIG. 19 a sectional view of a latch keeper housing and tongue latched therein.

After left unit 14 is in a dinette arrangement, slide means 42 is again unlocked by operating actuating means 64, thereby allowing right unit 12 to be pushed rearwardly so that inner side 13 thereof is positioned as close as possible to side wall 35. In this position both units are directly opposite one another, as seen in FIG. 1. As unit 12 is moved rearwardly it is locked in place at the rear of roller-slide plate 44 by locking pin 88, as shown in FIG. 10, the frame structure 16 being secured from longitudinal movement against end wall 37. To prevent rotational movement of unit 12 a second latching tongue 97 is provided which is located adjacent the right side of the rear of main-frame member 19 and is adapted to be received in keeper 98 as unit 12 is forced rearwardly along wall 37. Keeper 98 is mounted to end wall 37 as illustrated in FIGS. 2 and 8. The arrangement of latch tongue 97 is accomplished by having a V-shaped groove 99 (seen in FIG. 17) formed in the bottom surface thereof so as to be received in the slotted opening 100 in the face of keeper 98 (seen in FIGS. 18).

Figure 12:
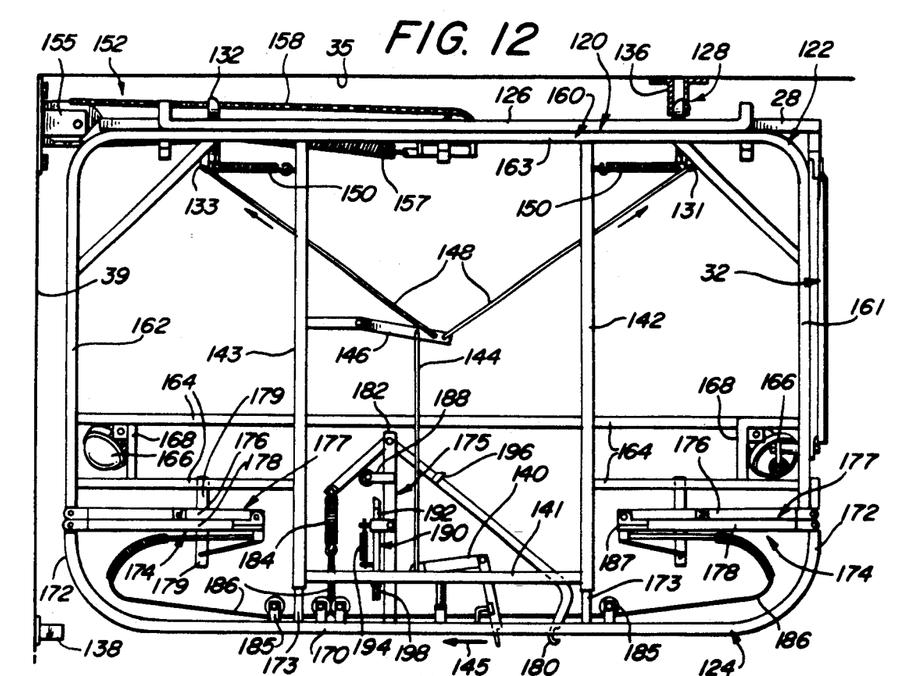
FIG. 12 is a top plan view of the left sofa unit with the cushions removed so as to illustrate the detail of the frame structure thereof.

The following is a description of the structure of the second unit of the invention which is also referred to as left unit 14. Referring more particularly now to FIG. 12, there is illustrated a frame structure 120 which closely resembles frame structure 16 of right unit 12. That is, frame structure 120 is defined as having a main frame section 122 and a extendible secondary frame section 124. Main frame section 122 is also provided with a vertical back-rest frame 126. Frame structure 120 is shown in FIG. 12 as being secured to side wall 35 by means of frame-locking means, generally indicated at 128. Frame-locking means 128 includes a first locking tongue 130 and a second locking tongue 132. First locking tongue 130 is mounted at the right of rear main frame section 122 so as to be in positioned to lock into the first keeper housing 136. Second locking tongue 132 is mounted adjacent the left side of main frame section 122 and is positioned to be received in a second keeper 138 which is mounted to wall 39 of the designated area. When unit 14 is positioned in either a sofa mode or a bed mode, frame structure 120 is secured in parallel relation against wall 35, as shown in FIGS. 2, 3 and 12. Both the first and second latch tongues are operated by an operating means that is defined by a crank lever 140 which is pivotally attached to a front cross bar 141. Cross bar 141 is secured between elongated tubular members 142 and 143 of main frame 122. A rod 144 is interconnected between crank lever 140 and lever arm 146, which is attached to tubular member 143. When crank lever 140 is moved in the direction of arrow 145, rod 144 forces lever arm 146 upwardly, whereby rods 148 will bring the pivotal hook members 131 and 133 of respective tongues 130 and 132 to a retracted position against the biasing force of springs 150.

When hook member 131 is retracted, unit 14 is free to be moved to the positions illustrated in FIGS. 6 and 1. To establish a smooth pivotal and rotational movement of unit 14 there is provided a motion control means, designated generally at 152. Motion-control means 152 comprises a carriage arm 154 which is pivotally attached at one end thereof to a wall bracket 155 and at the opposite end thereof to a frame bracket 156. There is included therein a chain or belt 158 which is affixed to wall bracket 155 with the midsection of the chain or belt mounted about fixed sprocket 159 or a fixed pulley. An overriding spring member 157 is also included therewith having one end thereof attached to wall bracket 155 and the other end thereof to frame bracket 156. Together, chain 158 and spring 157 allow frame structure 120 to be swung and rotated from one position to another without much effort (shown in FIG. 7). Phantom lines in FIG. 7 indicate unit 14 as being moved from a position against wall 39 back to a sofa arrangement against wall 35 or being moved from a sofa arrangement against wall 35 to a dinette arrangement against wall 39. When left unit 14 is released and moved from wall 35 so as to be positioned against wall 39, latch tongue 132 will slide into keeper housing 138 (shown in FIG. 12), whereby unit 14 is secured from further movement until it is again unlocked and released by pulling crank lever 140.

When both units 12 and 14 are oppositely arranged against their respective walls 37 and 39, they then provide a dinette arrangement, as illustrated in FIG. 1. Each back-rest cushion 26 is lowered so as to allow their respective folded tables 28 to be unfolded from storage within the back-frame section of each unit. Tables 28 comprise a table-top section 30 and a foldable support means 32 which comprises upper arm member 34 secured to the underside of table-top section 30 and pivotally connected to lower arm member 33. Each lower arm member is pivotally secured to the inner side of their respective main frame section 17 and 122. As each table section is extended, they form a full table between the oppositely positioned units 12 and 14. Support legs 36 are unfolded from their folded position against the underside of the table tops 30, as shown in FIG. 1.

In FIG. 3, the two side-by-side units 12 and 14 are arranged as a bed, wherein the respective secondary frame section 19 and 124 have been extended to support their respective back cushions 26. It should be noted that secondary frame sections 19 and 124 are identical in structure and operation and therefore the description of frame section 124 will suffice for both secondary frame sections 19 and 124.

Referring more particularly to FIGS. 12 through 16, there is illustrated the sequential operation of arranging the secondary frame section to define a bed. In FIG. 12 frame structure 120 is shown as being secured to side wall 35 and the secondary frame section 124 thereof is shown in a retracted position against main frame section 122. As partially described heretofore, main frame sections 19 and 122 are formed having a peripheral U-shape frame member 160 that is defined be first and second strut members 161 and 162, respectively, and a rear strut member 163. Equally spaced apart between the first and second side strut members are parallel tubular members 142 and 143, as seen in FIG. 12 thereof. Secured between first side strut member 161 and tubular member 142, and second side strut member 162 and tubular member 143, are a pair of transverse strut members 164, strut members 164 being located adjacent the forward portion of the main frame section. Positioned just below transverse strut members 164 is a means to support the forward end of main frame 122. The support means, generally indicated at 165, includes rollers 166 mounted to a roller support frame 168.

Figure 13:
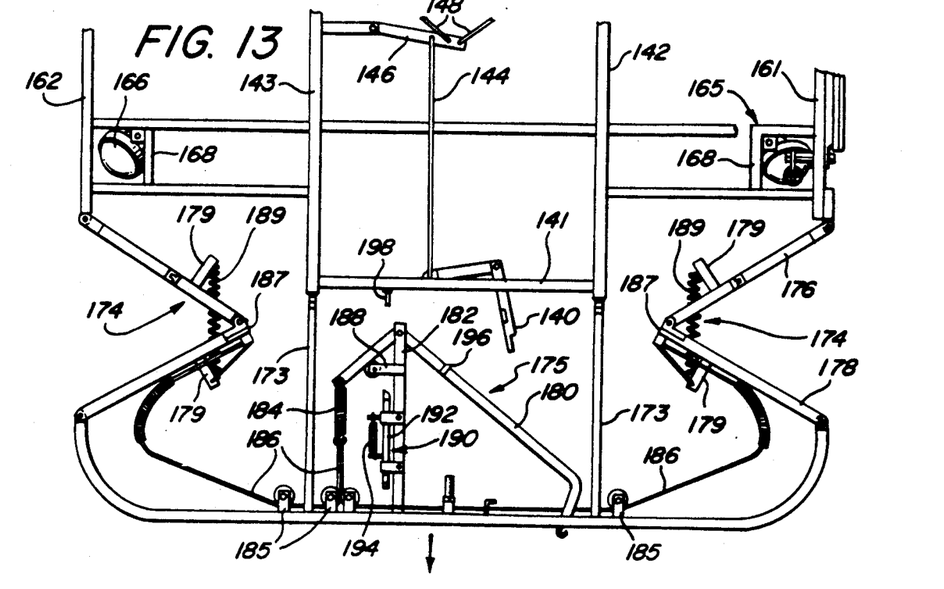
FIG. 13 is a top plan view of the left sofa unit with the secondary frame section thereof being extended to provide a bed arrangement.

Secondary frame structure 124, like that of secondary frame structure 19, comprises a front strut member 170 and opposite side strut members 172. A pair of spaced telescoping bar members 173 are secured to front strut 170 so as to be slidably mounted in tubular members 142 and 143. Side strut members 161 and 162 of main frame section 122 are hingedly connected to side strut members 172 of extendible frame section 124 by means of a foldable hinge means, designated generally at 174. Hinge means 174 includes an operating means, generally indicated a 175. In FIG. 12 the extendible secondary frame section 124 is shown in a retracted position with hinge means 174 being shown in a folded position. In FIG. 13 frame section 124 and hinge means 174 are shown in a partially extended position, and in FIG. 14, both frame section 124 and hinge means are shown in a fully extended bed position.

Accordingly, hinge means 174 includes a pair of hinges 177 each comprising a pair of hinge arms 176 and 178, the outer ends of each hinge arm being pivotally connected to the respective side strut members of the two frame sections 122 and 124. The opposite inner ends of hinge arms 176 and 178 are hingedly connected so as to be folded or unfolded as required for the particular operation. A folding means 175 is operably connected to each hinge 177 to cause it to fold or unfold. This means comprises a bell crank lever 180 pivotally mounted to a support leg 182 which is secured at one end thereof to front strut 170. One end of bell crank lever 180 extends outwardly from front strut 170 so as to be rotated when moved in the direction of arrow 145. The opposite end of crank 180 is provided with a spring 184 to which a pulley line or cable 186 is attached. Cable 186 extends through a series of pulleys 185 in one direction so as to be attached adjacent the hinged end 187 of one of the hinge arms 178, and in the opposite direction so as to be attached to the other hinge arm 178. Spring 184 provides constant tension on cable 186 and bell crank lever 180. A limiting means 188 is attached to leg 182 which engages crank 180 to limit the movement of the crank due to the downward force of spring 184. However, the pulling force of spring 184 with respect to cable 186 is controlled by an override spring 189 that is attached to pivotally connected hinge arms 176 and 178 by extended fingers 179. Override spring 189 holds the two hinge arms in a secure closed position, as seen in FIG. 12, and holds arms 176 and 178 in a fully secured extended position, as shown in FIG. 14.

Folding means 175 also includes a locking means 190 that comprises a latch pin 192 slidably mounted to leg 182, wherein latch pin 192 is biased upwardly by spring 194 so as to lockingly engage latch member 196 which is affixed to bell crank lever 180. (See FIGS. 15 and 16.)

To position secondary frame sections 19 and 124 of respective units 12 and 14 from a retracted position to an extended position, one simply pulls the particular secondary extendible frame section outwardly from the main frame section. FIG. 13 illustrates the secondary frame section 124 as being pulled forwardly and outward of main frame section 122. As frame section 124 moves forward hinge arms 176 and 178 start to open, causing override spring 189 to stretch and telescoping bars 173 to slide from tubular members 142 and 143. When fully extended as illustrated in FIG. 14, secondary frame 124 is held in a fully extended position by means of springs 189, thus pulling hinge arms 176 and 178 into an override open position, whereby spring 189 is arranged inwardly of hinge 174 by projecting support bar members 179 that are secured to the respective hinge arms 176 and 178. When both units 12 and 14 are fully extended, cushions 24 and 26 are then positioned in a side-by-side, flat, bed-like arrangement as seen in FIG. 3.

Figure 14:
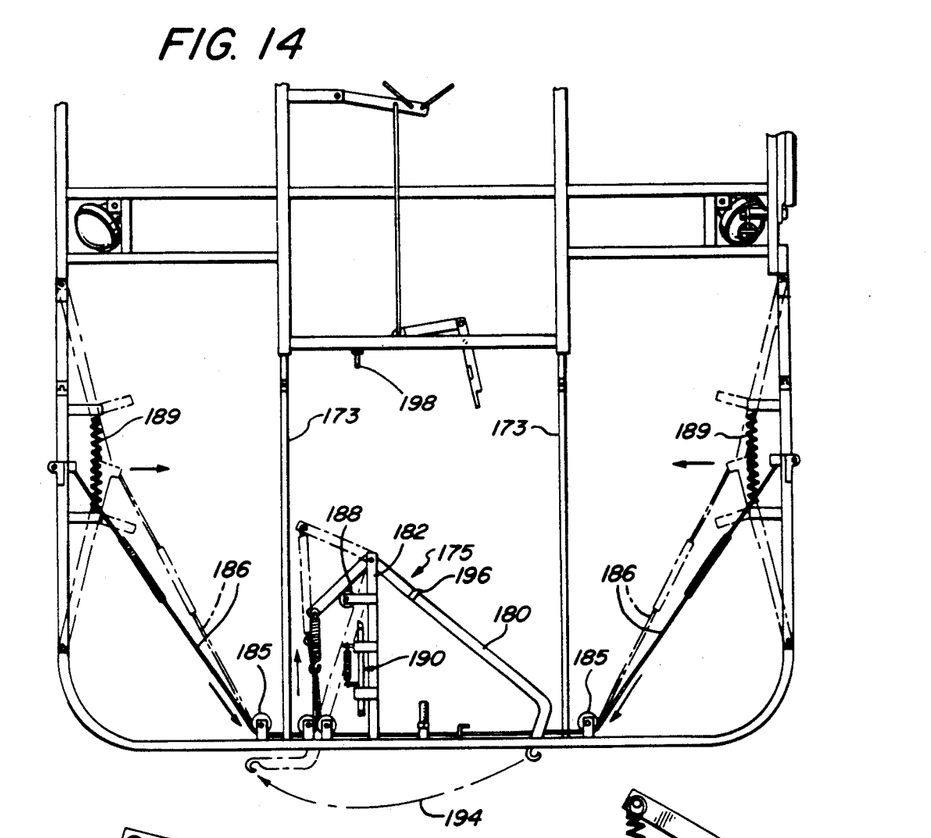
FIG. 14 is a top plan view thereof positioned in a fully extended bed position.
Figure 15:
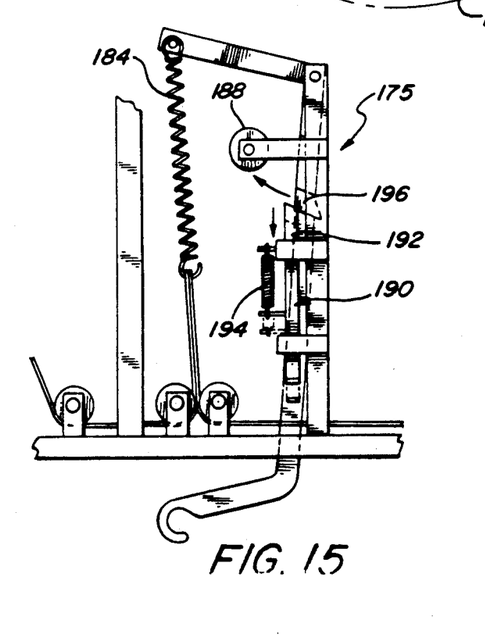
FIG. 15 is an enlarged view of a releasable latching mechanism.
Figure 16:
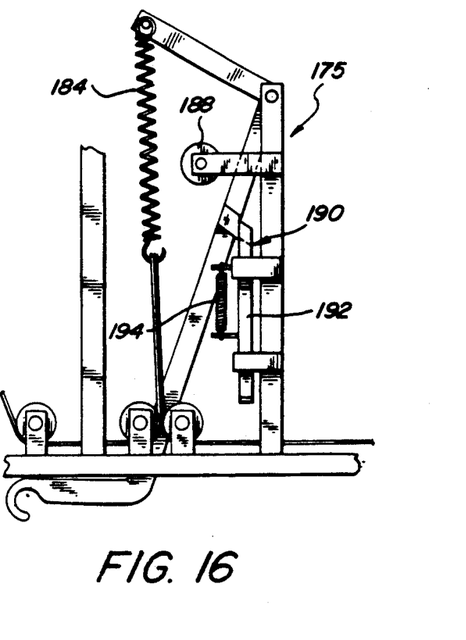
FIG. 16 is another view similar to FIG. 15 with the lever of the releasable latching mechanism in a fully released position.

When the bed mode is to be changed back to the sofa mode, bell crank lever 180 must first be moved to the left, as shown in FIG. 14 by arrow 194. As lever 180 is moved to the left, both cables 186 are pulled, causing the connected hinge arms 174 and 176 to fold inwardly against the biasing force of spring 189, as represented by the phantom lines illustrated in FIG. 14. The movement of lever 180 also activates locking means 190 so that lock member 196 engages latch pin 192, thus forcing it downwardly so as to lock behind pin 192, as illustrated in FIGS. 15 and 16. This prevents override spring 189 from pulling hinge arms 176 and 178 back to a fully open position. Frame section 124 can be readily pushed back to a retracted position, as shown in FIGS. 13 and 12. As frame 124 is returned to the retracted position of FIG. 12, latch pin 192 will engage fixed pin 198 which is mounted on front of cross bar 141, and latch pin 192 will be moved out of locking engagement with lock member 196. Lever 180 will automatically return to its normal released position by means of spring 184.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What I claim is:

1. An improved two-unit convertible facility arranged to be positioned within a limited space that includes at least a side wall and oppositely disposed first and second end walls, and wherein said units are adapted to be selectively arranged to define a mode of use such as a sofa, a bed or a dinette, wherein said convertible facility comprises:
a first furniture unit;
a second furniture unit positioned in close relation to the other;
said first and second furniture units comprising:
a main frame section;

a secondary frame section extendibly attached to said main frame section;

means for extending said secondary frame section outwardly from said main frame section;

a back-rest frame member attached to said main frame section;

means for releasably securing each of said furniture units to respective adjacent walls;

means for rotating said first and second furniture units between the side wall and a respective end wall so as to selectively define one of the modes of use; and a table assembly foldably mounted within each of said furniture units.

2. A two-unit convertible facility as recited in claim 1, including means for sliding said first unit as said first unit is moved from one position to another and means for controlling said slide means.

3. A two-unit convertible facility as recited in claim 2, including a seat cushion and a back-rest cushion.

4. A two-unit convertible facility as recited in claim 2, wherein said rotating means of said first furniture unit is mounted to said sliding means, and wherein the rotational and sliding movement of said first furniture unit perform in cooperation with each other.

5. A two-unit convertible facility as recited in claim 4, wherein said rotating means of said first furniture unit includes motion-control means.

6. A two-unit convertible facility as recited in claim 5, wherein said sliding means comprises:

a slide plate fixedly mounted to the first end wall; and a slidable pivotal bracket slidably supported on said slide plate, said pivotal bracket including a back plate having a plurality of rollers mounted thereon so as to be received on said slide plate, whereby said pivotal bracket moves back and forth thereon; and wherein said motion-control means is connected between said slidable pivotal bracket and main frame thereof.

7. A two-unit convertible facility as recited in claim 6, wherein said motion-control means of said first furniture unit comprises an elongated carriage arm member having one end thereof pivotally attached to said slidable pivotal bracket and the opposite end thereof pivotally attached to a fixed bracket mounted to said main frame.

8. A two-unit convertible facility as recited in claim 7, wherein said second furniture unit has a motion control means which comprises;

a wall bracket member affixed to the second end wall; and an elongated carriage arm member having one end thereof pivotally attached to said wall bracket, the opposite end thereof being pivotally attached to a bracket mounted to said main frame of said second furniture unit.

9. A two-unit convertible facility as recited in claim 8, wherein said motion-control means of said first furniture unit includes a chain affixed to said slidable pivotal bracket and looped about a fixed sprocket member mounted to said fixed bracket of said main frame of said first furniture unit.

10. A two-unit convertible facility as recited in claim 9, wherein said motion-control means of said second furniture unit includes a chain affixed to said wall bracket and looped about a fixed sprocket member mounted to said bracket mounted to said main frame of said second furniture unit.

11. A two-unit convertible facility as recited in claim 8, wherein said means for releasably securing said furniture units to the adjacent walls comprises:

a first latching means positioned to latch said main frame of said first and second furniture units to the side wall;

a second latching means positioned to latch said main frame of said first and second furniture units to the respective end walls; and first and second actuating means connected to respective first and second latching means.

12. A two-unit convertible facility as recited in claim 11, wherein said first latching means of said first furniture unit includes a latching tongue operably mounted to the main frame thereof and a latch housing mounted to the side wall, and wherein said second latching means of said first furniture unit includes a fixed latching tongue mounted to the main frame thereof and a latch housing mounted to the first end wall.

13. A two-unit convertible facility as recited in claim 12, wherein said first latching means of said second furniture unit includes a first latching tongue operably mounted to the main frame thereof and a first latch housing mounted to the side wall to receive said first latching tongue therein, and wherein said second latching means of said second furniture unit includes a second latching tongue operably mounted to said main frame thereof to engage a second latch housing mounted on the second end wall.

14. A two-unit convertible facility as recited in claim 6, wherein said sliding means includes a slide-control means which includes a first actuating means mounted on said first furniture unit, and wherein said first actuating means simultaneously operates both said slide-control means and said releasable securing means.

15. A two-unit convertible facility as recited in claim 14, wherein said slide-control means inlcudes means for locking said slidable pivotal bracket in a retracted position or in an extended position for selectively positioning said first furniture unit from one mode of use to another.

16. A two-unit convertible facility as recited in claim 15, wherein said means for extending said secondary frame section outwardly from said main frame section comprises;

means for slidably mounting said secondary frame section to said main frame section;

hinge means connecting said main frame section to said secondary frame section;

means for holding said secondary frame section in retracted and extended positions, said holding means mounted to said hinge means thereof; and folding means operably connected to said hinge means, whereby said hinges means are moved to a folding position from a fully extended position.

17. A two-unit convertible facility as recited in claim 16, wherein said slidable means comprises:

a plurality of telescoping frame members; and wherein said hinge means is defined by a pair of hinges, each having a pair of arm members interconnecting said main frame section to said secondary frame section; and wherein said holding means is defined by an override spring member attached between said hinge-arm members; and wherein said folding means is defined by a hand lever hingedly mounted to said secondary frame section and having operably connected thereto a cable wherein the ends of said cable are each attached to the respective hinges.

18. A two-unit convertible facility as recited in claim 17, wherein said folding means includes means for locking said folding means in an operative position, said locking means being defined by a slidable latch pin mounted to said secondary frame section that includes a biasing spring so as to be latchingly engaged by a latch member mounted to said hand lever, and a latch-release means positioned on said main frame section for releasable engaging said slidable latch pin when said secondary frame section is fully retracted.

19. A two-unit convertible facility as recited in claim 3, wherein said table assembly comprises:

a first table section hingedly mounted to said main frame section of said first furniture unit;

a second table section hingedly mounted to said main frame section of said second furniture unit;

table-support means mounted to each of said first and second table sections, whereby said table sections are foldable in a retracted position within said respective back-rest frame member and extendible alongside the respective table sections as they are arranged in juxtaposed relation with each other to define a table assembly.

20. A two-unit convertible facility as recited in claim 19, wherein said table-support means comprises a pair of hinged arm members, and a foldable support leg having a foldable release means.

* * * * *